United States Patent [19]
Harbrecht et al.

[11] Patent Number: 5,095,176
[45] Date of Patent: Mar. 10, 1992

[54] AERIAL METALLIC SHIELDED CABLE HAVING WATERBLOCKING PROVISIONS

[75] Inventors: Paul W. Harbrecht, Roswell; Frederick L. Henklein, Lawrenceville, both of Ga.; David M. Mitchell, Scottsdale, Ariz.; Cecil G. Montgomery, Cumming, Ga.; Francis J. Mullin, Chamblee, Ga.; James J. Riordan, Alpharetta, Ga.

[73] Assignee: AT&T Bell Laboratories, Murray Hill, N.J.

[21] Appl. No.: 536,816

[22] Filed: Jun. 12, 1990

[51] Int. Cl.[5] .......................... H01B 7/18; H01B 7/28
[52] U.S. Cl. .................................. 174/23 R; 174/41; 174/70 A; 174/107
[58] Field of Search ................. 174/23 R, 23 C, 41, 174/70 A, 107, 115

[56] References Cited
U.S. PATENT DOCUMENTS

| | | | |
|---|---|---|---|
| Re. 30,715 | 8/1981 | Woytiuk | 174/23 C |
| 3,207,836 | 9/1965 | Slechta | 174/107 |
| 3,267,201 | 8/1966 | Pusey et al. | 174/41 |
| 3,711,621 | 1/1973 | Jachimowicz | 174/23 R |
| 4,132,857 | 1/1979 | Scarola et al. | 174/107 |
| 4,328,394 | 5/1982 | Aloisio, Jr. et al. | 174/106 D |
| 4,378,462 | 3/1983 | Arnold et al. | 174/70 A |
| 4,563,540 | 1/1986 | Bohannon, Jr. et al. | 174/23 R |
| 4,595,431 | 6/1986 | Bohannon, Jr. et al. | 174/107 X |
| 4,815,813 | 3/1989 | Arroyo et al. | 174/23 C X |
| 4,820,560 | 4/1989 | Buchwald et al. | 174/23 C X |
| 4,867,526 | 9/1989 | Arroyo | 350/96.23 |
| 4,909,592 | 3/1990 | Arroyo et al. | 174/23 C X |

FOREIGN PATENT DOCUMENTS 2169094 7/1986 United Kingdom .................. 174/41

*Primary Examiner*—Morris H. Nimmo
*Attorney, Agent, or Firm*—Edward Somers

[57] ABSTRACT

An aerial cable (20) includes a transmission portion and a supporting portion. The transmission portion includes a core (21) comprising at least one transmission medium enclosed in a relatively flexible dielectric wrapping material (23). The wrapping material is enclosed by two metallic shields (31, 40) between which is interposed a layer (42) of a waterblocking material. An outer one (40) of the shields is formed with overlapping longitudinal edge portions at least one of which is turned inwardly toward the core. A cavity (44) between those edge portions is provided with a waterblocking material which inhibits the longitudinal flow of water. The supporting portion includes a longitudinally extending strand material (60) capable of supporting a length of the cable which is supported by poles, for example, at ends of the length. A plastic jacket (45) encloses the supporting portion and the transmission portion. A portion (62) of the jacket which encloses the supporting portion is connected by a relatively thick web (66) to a portion which encloses the transmission portion.

22 Claims, 3 Drawing Sheets

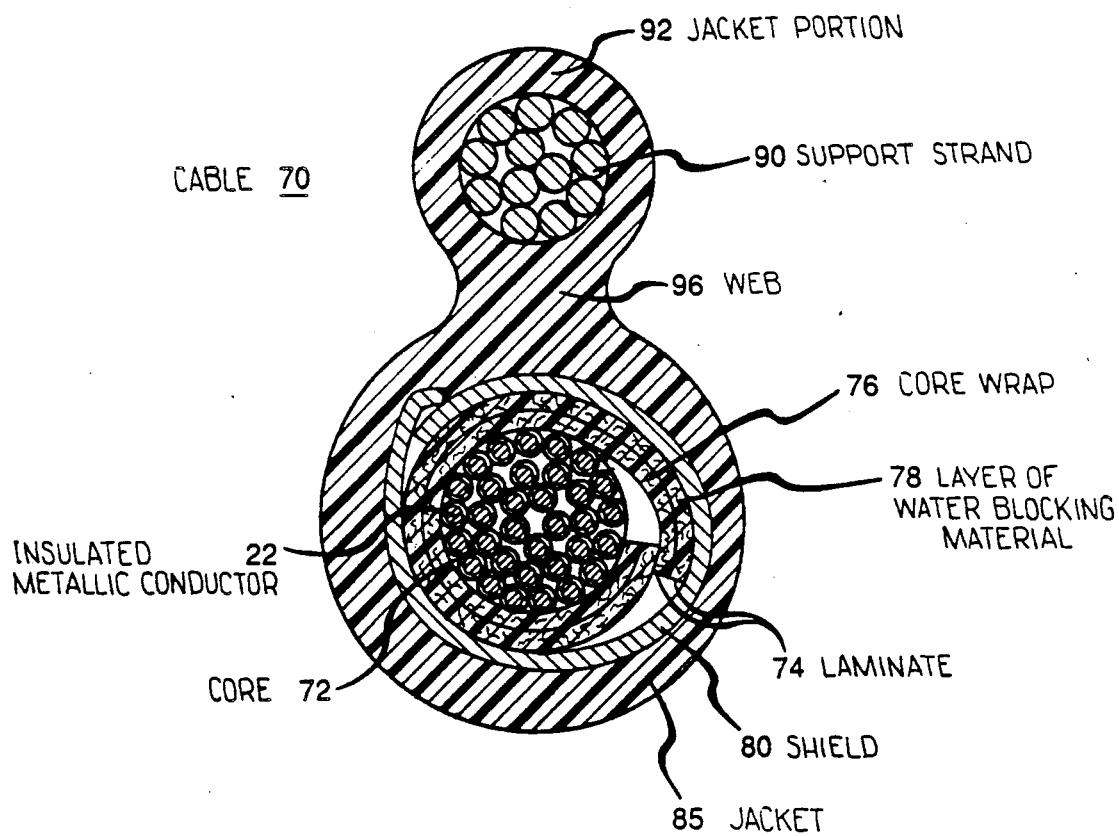

AERIAL METALLIC SHIELDED CABLE HAVING WATERBLOCKING PROVISIONS

TECHNICAL FIELD

This invention relates to an aerial cable. More particularly, the invention relates to an aircore cable which includes waterblocking provisions within a sheath system thereof, in which mechanical reinforcement is accomplished without compromising flexibility and in which electrical grounding is simpler than in prior art reinforced cables. The aircore cable of this invention may include a support strand.

BACKGROUND OF THE INVENTION

Aerial cables still enjoy widespread use notwithstanding an effort to install utilities underground. Such cables may include copper transmission media, optical fiber transmission media or both. In some urban areas, overhead transmission cables which have been in use for many years now must be replaced. The existing cables in many urban areas most likely will be replaced with overhead lines inasmuch as existing ducts are full and the cost for additional buried capacity in such urban area is uneconomical.

In one installation, an aerial cable is lashed to a support strand which extends between poles. In another, which is referred to as self-supporting or figure eight cable, a support strand is enclosed by an outer plastic jacket which is integrally connected by a web to a plastic jacket which encloses a core comprising a plurality of plastic insulated conductors. The core may be undulated as shown in U.S. Pat. No. 3,207,836, which issued on Sept. 21, 1965, to prevent the transmission of tensile strain from the support strand to the core. The core is enclosed by a plastic core wrap material and a corrugated aluminum shield. Mechanical reinforcement has been provided in the prior art by enclosing the undulated core with an inner jacket. See U.S. Pat. No. 4,378,462 which issued on Mar. 29, 1983 in the names of W. S. Arnold, L. M. Borowicz, Jr. and L. M. Rackson. A corrugated steel layer, coated with a flooding compound for corrosion resistance, is formed over the inner jacket which is then covered with the outer jacket. The jacket typically is made of polyethylene.

Customers have evinced a desire to overcome some problems which are associated with cables of the kind just described. This is particularly true in those instances where extensive rehabilitation work is being planned.

One problem relates to splicing. Craftspeople do not relish the thought of having to cut through two plastic jackets in order to access the core and splice conductors. Although there are some prior art cables which include only one shield and one jacket, these cables are not sufficiently waterblocked by today's standards. For example, when a craftsperson makes a slit in a web of typical prior art self-support cables, the slit may extend into the cable jacket which allows water to enter. Clearly, candidate aerial cables must include suitable waterblocking provisions.

Also, as is well known, aerial cable must be grounded. Generally, this is accomplished by installing electrical ground continuity throughout the length of the cable. At each splice location, for example, grounding or bond clamps, as they are often called, are attached to metal components of the cable and connected by a strap wire to carry ground continuity across the splice location. Should the aerial cable include two metallic shields such as the one described hereinbefore wherein the two shields are spaced apart by a plastic inner jacket, it becomes necessary to use two bond clamps. Desirably, one bond clamp at each location should suffice.

The sought-after cable must have suitable strength characteristics. Because of the loading to which the cable may be subjected, such as ice and wind loading, for example, steps must be taken so as not to overload the conductors. Otherwise, the transmission quality may be affected, whereas if the transmission media comprise optical fibers, the fibers may break.

What is needed and what seemingly is not provided for in the prior art is an aerial cable which facilitates splicing and electrical bonding. Also, it must be one which includes suitable waterblocking provisions and which is sufficiently flexible so as not to impede installation. The sought after cable must be competitive in price with prior art offerings and be easily installed. Also desired is a cable which may include metallic conductor and/or optical fiber transmission media.

SUMMARY OF THE INVENTION

The foregoing problems of the prior art have been overcome with the aerial cable of this invention. An aerial cable comprises a core comprising at least one longitudinally extending transmission medium and a relatively supple material which encloses the core and provides electrical insulation between the core and a surrounding sheath system. A shielding system encloses the relatively supple material. Interposed between at least a portion of the sheath system and the core is a layer of a waterblocking material. In a preferred embodiment, a first metallic shield of the sheath system encloses a supple dielectric core wrap material and a second metallic shield encloses the first metallic shield. Interposed between the first and the second metallic shields is a layer of a waterblocking material.

In order to allow the cable to be supported in a span between poles, for example, a longitudinally extending support strand may be included and spaced from the second metallic shield. The support strand is capable of supporting a length of the cable spanning between two poles. In the alternative, the cable of this invention may be lashed to a separate support strand which spans between poles. A plastic jacket includes a portion which encloses and is bonded to the shielding system and, if the cable includes a support strand, a portion which encloses the support strand. The portions of the jacket are connected by a web of the plastic material of which the jacket is comprised.

Because the aerial cable of this invention does not include an inner jacket, electrical bonding of the two shields in the preferred embodiment to establish a ground connection is simplified. Further, because of the absence of an inner jacket, the thickness of the outer jacket may be increased without increasing the overall transverse cross-section of the cable.

BRIEF DESCRIPTION OF THE DRAWING

Other features of the present invention will be more readily understood from the following detailed description of specific embodiments thereof when read in conjunction with the accompanying drawings, in which:

FIG. 3 is an end sectional view of an alternative embodiment.

DETAILED DESCRIPTION

Figure 1:
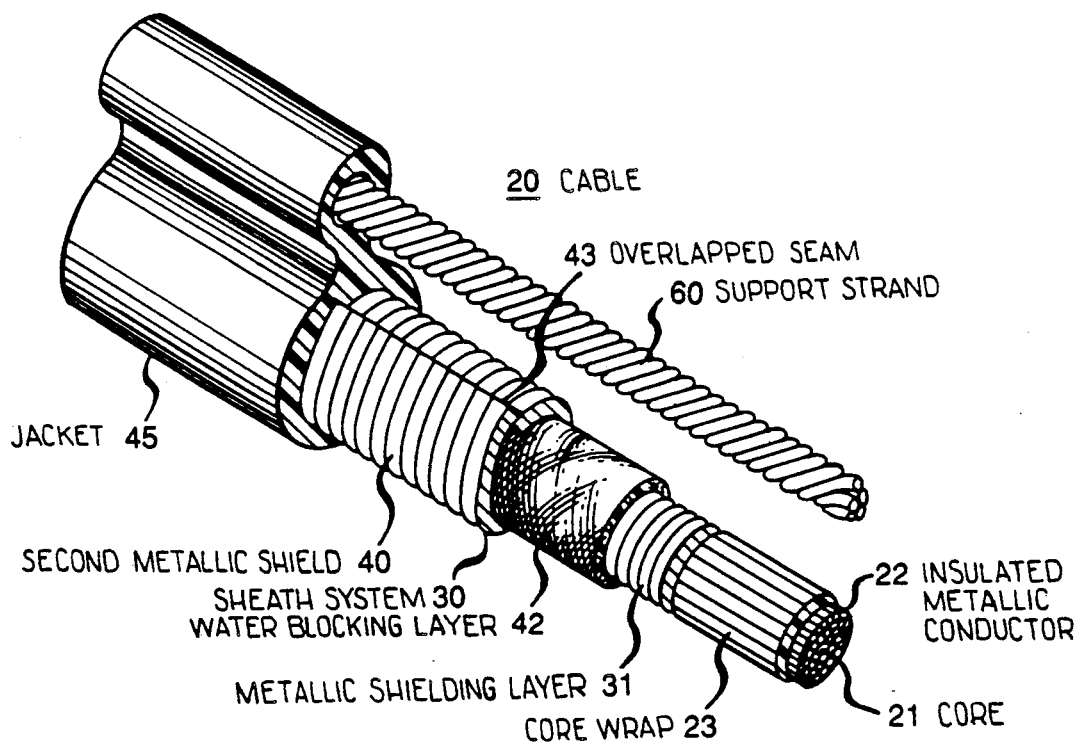
FIG. 1 is a perspective view of an aerial cable of this invention.
Figure 2:
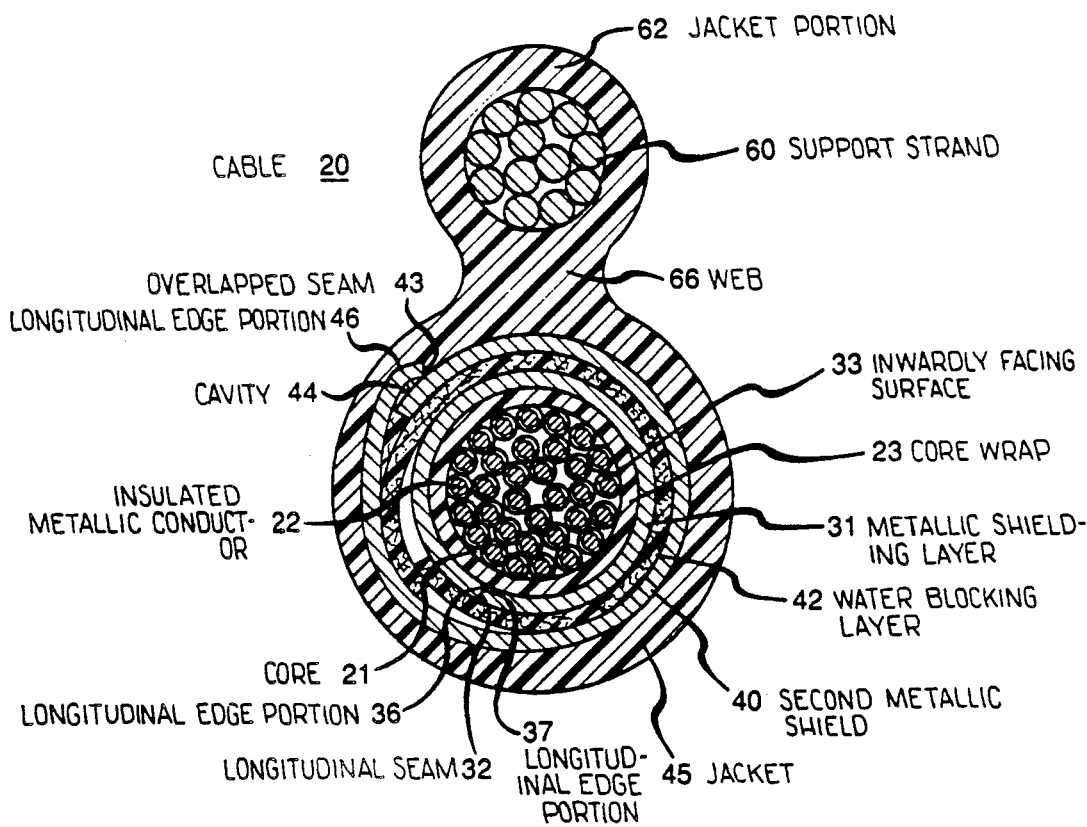
FIG. 2 is an end sectional view of the aerial cable of FIG. 1.

Referring now to FIGS. 1 and 2, there is shown an aerial self-support cable, designated generally by the numeral 20. The cable 20 comprises a core 21 having a plurality of transmission media. The transmission media may include a plurality of undulated individually insulated metallic conductors 22—22 or a plurality of optical fibers (not shown). The core 21 is enclosed by a dielectric core wrap 23 which may be polyethylene terephthalate, for example.

The core 21 is enclosed in a sheath system which is designated generally by the numeral 30. The sheath system 30 is designed to protect the cable from the ingress of moisture which could degrade the quality of the transmission signals, to protect the cable from mechanical and electrical damage, and to screen the core from electromagnetic interference. The sheath system 30 also is capable of resisting buckling and kinking during installation.

Adjacent to the core 21 is a first component of the sheath system 30, the first component being a metallic shielding layer 31 of a shielding system. In a preferred embodiment, the first component is corrugated and is wrapped about the core to form a longitudinal seam 32 with an inwardly facing surface 33 facing the core and with an outwardly facing surface oriented toward other components of the sheath system 30. In a preferred embodiment, the seam 32 is formed so that longitudinal edge portions 36 and 37 of the layer 31 may be butted together (see FIG. 2) or spaced slightly apart. In the alternative, the edge portions 36 and 37 are overlapped.

The shielding layer 31 is effective to absorb energy from stray electromagnetic fields which emanate from sources outside the cable 20. Typically, the layer 31 is made from a tape of electrical conductor-grade aluminum alloy having a thickness of approximately 0.020 cm.

Surrounding the shielding layer 31 is an outer second metallic shield which is designated generally by the numeral 40. The outer shield 40 is used to provide mechanical protection for the cable 20 such as resistance to animal attack. Also, the shield 40 imparts to the cable suitable strength for resisting buckling during installation of the cable. In a preferred embodiment, the shield 40 is formed from a chrome-coated or tin-plated corrugated steel tape having a thickness of about 0.015 cm.

The tape from which the shield 40 is formed is wrapped longitudinally about the shielding layer 31 with longitudinal edge portions forming an overlapped seam 43. Further, an outer longitudinal edge portion 46 (see FIG. 2) is turned inwardly as described in K. P. Trusch U.S. Pat. No. 4,100,003 which issued on July 11, 1983. This is done in order to prevent the outer overlapping edge portion which forms a step discontinuity in jacket thickness along its longitudinal edge from undesirably protruding outwardly.

As can be seen in FIG. 2, the configuration of the outer overlapping portion of the shield 40 causes a longitudinally extending cavity 44 to be formed. In order to prevent the longitudinal migration of water along the cavity, the cavity is filled with a sealant material. A suitable sealant material is a polymeric material, such as one designated Duribbon 72-6966 and marketed by the National Starch and Chemical Corporation, for example. In the alternative, a waterblocking yarn such as one which is described in U.S. Pat. No. 4,815,813 which issued in Mar. 28, 1989 and which is incorporated by reference hereinto may be disposed within the cavity 44.

Interposed between the inner shielding layer 31 and the outer shield 40 is a layer 42 comprising a waterblocking material. The waterblocking layer 42 may comprise a tape which has been wrapped about the inner shielding layer 31 and which comprises two layers having a waterabsorbent powder disposed therebetween. For another example of a suitable waterblocking material, see C. J. Arroyo U.S. Pat. No. 4,867,526 which issued on Sept. 19, 1989 and which is incorporated by reference hereinto.

The waterblocking layer 42 is effective to prevent the flow of water longitudinally along the cable. When water contacts the layer 42, the superabsorbent powder, for example, swells and blocks water paths longitudinally within the cable.

The outermost component of the sheath system 30 is a jacket 45. Typically, the jacket 45 is comprised of a plastic material such as polyethylene, for example.

In the aerial cable 20 of this invention, the jacket 45 is bonded to the outer shield 40 to form a laminated structure. It has been found that, by bonding the jacket 45 to the outer shield 40, buckling during handling and installation is resisted by the jacket-shield laminate. See. G. M. Yanizeski, E. L. Johnson and R. G. Schneider "Cable Sheath Buckling Studies and the Development of a Bonded Stalpeth Sheath" pp. 48-58 *Proceedings 29th International Wire and Cable Symposium*, Nov. 18–20, 1980. Bonding of the jacket to the outer shield 40 also improves the resistance of the sheath system as a whole to damage resulting from the gnawing action of rodents, squirrels and woodpeckers, for example. Because the jacket is not readily separated from the metallic substrate shield, gnawing damage tends to be localized and water intrusion at jacket openings is minimized or eliminated.

In order to provide the cable 20 with a sheath system which is effective for resisting buckling and for preventing the infusion of moisture, the shield 40 may include an adhesive-like material which is precoated at least along its outwardly facing surface. Then, when the jacket 45 of a plastic material, usually polyethylene, is applied over the steel shield 40, the heat of extrusion causes the jacket to become bonded to the outwardly facing surface of the steel shield.

The material which is used to precoat the steel shield 40 is an adhesive material which has the ability to develop firm adhesion to and prevent corrosion of the metallic outer shield 40. The bonding of the shield 40 to the jacket 45 over a substantial portion of the outwardly facing surface of the outer shield results in a sheath system 30 which inhibits the penetration of moisture into the cable core.

In one embodiment, the material which is used to bond the shield 40 to the jacket is comprised of an ethylene acid copolymer. A metallic strip or tape which is precoated with same is available from commercial sources. For example, the combination of a metallic strip which is precoated with an ethylene acrylic acid copolymer adhesive-like material is marketed by the Dow Chemical Company of Midland, Mich., under designations X0-5554.21 and X0-5554.28 and is referred to as Zetabon ® plastic clad metal sheating for electrical wire and cable.

It is important to recognize that while in some cables the outer shield is coated with the adhesive-like material such as that just-described, such as an acrylic acid copolymer, other arrangements come within this invention. For example, it is well known that an improved bond is established between a polyethylene jacket and a polyethylene coated metallic shield. Consequently, it has been suggested that the outer shield be precoated or coextruded with dual layers-one of the acrylic acid copolymer and the other, a typical polyethylene. This construction is disclosed in U.S. Pat. No. 4,132,857 which issued on Jan. 2, 1979, in the name of L. S. Scarola.

These properties also become important to the preferred embodiment of the sheath system of this invention in which the longitudinal seam is not intentionally bonded. In fact, as mentioned hereinbefore, the longitudinal edge portion 46 of the shield 40 is directed inwardly toward an underlying portion as a metallic tape is formed into the shield 40.

In order to take full advantage of the precoated outer shield 40, which it will be recalled is corrugated, contact of a substantial portion of the area of the outer surface of the outer shield with the jacketing material must be made. The jacketing material must be such that it is capable of being flowed into the valleys of the corrugations of the outer shield under manufacturing conditions so that it contacts substantially all the outer surface areas of the outer shield.

Filling of the corrugations by the jacketing material also is important with respect to the ingress of moisture. If the corrugations are not filled, the plastic spans from one peak to another and creates a void between it and the bottom of the valley. This provides a path by which moisture can diffuse through the jacket, then travel circumferentially about the cable and enter the core through the seam. It has been found that if the jacketing material penetrates and fills the corrugations and forms a substantial bond with the shield, sufficient diffusion resistance is obtained notwithstanding the absence of a bonded seam. Sufficient filling of the corrugations by the plastic jacketing material and the development of a relatively high bond strength not only ensure a relatively high degree of diffusion resistance, but they are also important to the continued integrity of the sheath system during the time before installation when the cable is stored.

Bonding of the jacketing material to the outer shield contributes to the buckling resistance of the cable of this invention. The corrugated construction of the outer shield cooperates with a jacketing material having excellent penetration of the corrugations to provide a cable sheath system in which the jacket is superbly bonded to the shield. Particularly at lower temperatures, the ability of a sheath system comprising corrugated metal covered with a plastic which fills the corrugations to resist delamination exceeds that of the plastic to an uncorrugated strip of metal, being an order of magnitude larger than the ratio of surface area of a corrugated to an uncorrugated shield. In fact, because of this synergistic effect of corrugating the outer shield, which may be termed the "corrugation effect", the sheath system of this invention resists buckling notwithstanding occasional incomplete fill of the corrugations of the outer shield.

In order to support the cable between two poles, for example, the cable in a preferred embodiment may include a support strand 60. The support strand 60 typically is made of a plurality of strands of high tensile strength material which are twisted together. Typically, the strands are made of a material such as galvanized steel, for example.

About the support strand of the aerial cable 20 is disposed another portion of the jacket 45. In this embodiment, the jacket comprises two portions, one designated 62 which encloses the support strand and another which encloses the transmission portion.

In a preferred embodiment, the support strand 60 is caused to adhere to the plastic of the jacket portion 62. This may be accomplished by flooding the support strand with a tar material or by coating the strand with a bonding agent which when subjected to the heat of extrusion causes the support strand to adhere to the plastic extrudate of the jacket.

Further, as can be seen in the drawings, the two portions of the jacket are connected by a web 66. The web 66 which connects the jacket portions about the support strand and about the transmission portion of the cable is wider than in the past. Typically, an aerial cable web had a width as measured along an axis extending parallel to a horizontal x-axis as viewed in FIG. 2 of 0.15 cm. In the cable of this invention, the width has been increased to about 0.30 cm. As a result, the cable is much more robust and unintended tearing of the jacket is avoided. Also, the height of the web as measured along an axis parallel to a vertical y-axis as viewed in FIG. 2 is greater than those of prior art cables, that is on the order of about 0.3 to 0.46 cm compared to 0.15 to 0.3 cm. This increase in height, supported by a greater width, provides a larger target for craftspersons in the field who need to cut the web to terminate the cable.

Advantageously, the cable of this invention includes only one jacket. Consequently, a craftsperson needs to cut through only one jacket in order to access the core and the transmission media therein. Also, the need for a filling composition of matter is eliminated which obviates problems of dripping because of exposure of the cable to the sun. The alternative of a pressurized air system to keep out water is expensive and must be maintained. The waterblocking layer of this invention mitigates this problem.

Further, as is known, the cable shield or shields must be bonded electrically at cable splice locations to carry electrical continuity across the splice to ground. This generally is accomplished by attaching clamping means, referred to as bond clamps, to the shield or shields on each side of the splice location. Of course, if two shields are used and if the shields are separated by an inner jacket, as in prior art reinforced cables, two bond clamps would have to be used. With the cable of this invention, the shields are spaced apart only a small distance to accommodate the waterblocking layer 42. As a result, only one bond clamp is needed.

Another advantage of the reinforced aerial cable 20 of this invention over the prior art is its outer diameter. That diameter is smaller than those of the prior art. This results notwithstanding an increased jacket thickness, i.e., from about 0.14 cm to 0.17 cm. The reduction in outer diameter has been achieved mainly by the absence of an inner jacket.

Surprisingly, the aerial cable 20 of this invention is at least as rodent resistant as prior art cables in which inner jacket was interposed between two shields. This is surprising inasmuch as the smaller the outer diameter of a cable, the more vulnerable it is to rodent attack. See U.S. Pat. No. 4,874,219, which issued on Oct. 17, 1989 in the names of C. J. Arroyo and P. D. Patel. However, it has been determined that because of the thicker walled jacket, because of the waterblocking layer which is interposed between the two metallic shields and because the outer jacket 45 is bonded to the underlying steel shield, the rodent protection is not sacrificed. Should a rodent or a woodpecker, for example, penetrate the sheath system to cause an opening therein, the waterblocking layer upon entry of water swells and seals off the cable to prevent internal travel of water.

The aerial cable of this invention also is craft-friendly. In the past, it had been customary to apply a layer of tar or similar waterblocking material on an outer surface of the steel outer shield before extruding a jacket thereover. This task was not appealing to craftspeople who had to enter the sheath system for splicing. In the aerial cable of this invention, the outer shield is bonded to the outer jacket and materials such as tar are not used therebetween.

In a preferred embodiment of the cable 20, not only is an outer surface of the outer shield 40 coated with a material such as ethylene, acrylic acid copolymer but also the inner surface of the outer shield and both the inwardly facing and outwardly facing surfaces of the inner shield are similarly coated. This is done in order to provide corrosion resistance for metallic surfaces in addition to that one already provided with the same material for bonding to the jacket.

In an alternative embodiment of the cable 20, a laminate may be interposed between the two metallic shields. The laminate comprises a plastic layer such as one comprised of Mylar ® plastic, for example, and an outwardly facing layer which includes suitable waterblocking provisions. Any water which penetrates the waterblocking layer is blocked from further inward movement by the plastic layer.

An alternative embodiment of this invention is depicted in FIG. 3. A cable 70 includes a transmission portion and, in a preferred embodiment, a support portion. The transmission portion includes a core 72 which includes undulated transmission media as in the cable of FIG. 1. About the core 72 is disposed a laminate 74 which comprises an inwardly facing dielectric plastic core wrap 76 such as one made of Mylar ® plastic material, for example. Laminated to the core wrap 76 is a layer 78 of a waterblocking material. The layer 78 of waterblocking material may comprise two tapes having a superabsorbent powder held therebetween or it may comprise a tape such as that disclosed in hereinbefore-identified C. J. Arroyo, U.S. Pat. No. 4,867,526. Enclosing the laminate 74 is a shield 80 which preferably is an alloy comprising iron and copper. In a preferred embodiment, the shield 80 comprises No. 194 copper alloy which is an alloy comprising 3% iron and 97% copper. Because of its excellent tensile strength as well as conductivity, the shield 80 is used instead of the aluminum and steel shields in the cable of FIG. 1.

A jacket 85 encloses support and transmission portions of the cable. Further, the support portions and the transmission portions are enclosed in portions of the jacket which are connected by a web 96. For the cable 70, the support portions may be identical to that of FIG. 1. A metallic support strand 90 is enclosed in a portion 92 of the jacket.

Although the embodiments of FIGS. 1 and 3 have been described to include a support strand, such is not necessary to the cable of this invention. Instead, either embodiment may be made without a support strand and the cable lashed to a separate supporting member which has been strung between poles.

It is to be understood that the above-described arrangements are simply illustrative of the invention. Other arrangements may be devised by those skilled in the art which will embody the principles of the invention and fall within the spirit and scope thereof.

We claim:

1. A cable which is suitable for aerial use, said cable comprising:
   a core comprising at least one longitudinally extending transmission medium;
   a relatively supple system having a core wrap portion which encloses said core and a portion which includes an elongated waterblocking member which is disposed about said core wrap portion and which is effective to inhibit the longitudinal flow of water;
   a metallic shielding system which encloses said portion of said supple system which encloses said core, said shielding system being such as to provide a substantially high conductivity and a relatively high tensile strength;
   a jacket which is made of a plastic material and which encloses and which is bonded to at least that portion of said shielding system which has a relatively high tensile strength, wherein said shielding system includes a metallic inner shield which is interposed between said core wrap portion and said elongated waterblocking member and a metallic outer shield which encloses said elongated waterblocking member and which is bonded to said jacket; and
   a longitudinally extending support strand which is spaced from said outer metallic shield and which is capable of supporting a length of said cable spanning aerially between two supporting structures;
   said jacket including a first portion which encloses and is bonded to said outer metallic shield and a second portion which encloses said support strand, said first and second portions of said jacket being connected by a web of said plastic material.

2. The cable of claim 1, wherein said relatively supple core wrap material core wrap comprises a dielectric plastic material.

3. The cable of claim 1, wherein said metallic inner shield comprises aluminum and said metallic outer shield comprises steel.

4. The cable of claim 1, wherein said inner shield is wrapped about said relatively supple core wrap material to have a longitudinal overlapped seam with a waterblocking material disposed between longitudinal overlapping edge portions of said inner shield.

5. The cable of claim 1, wherein said outer shield is formed about said inner shield to have an overlapped seam and wherein overlapping longitudinal edge portions of said outer shield have a waterblocking material disposed therebetween.

6. The cable of claim 5 wherein said waterblocking material which is disposed between overlapping edge portions of said outer shield comprises a yarn which is provided with a superabsorbent material.

7. The cable of claim 1, wherein said metallic outer shield is provided with a layer of an adhesive material which causes said jacket to become bonded to said outer shield.

8. The cable of claim 7, wherein said adhesive material comprises an adhesive copolymer material.

9. The cable of claim 1, wherein said inner and outer shields are sufficiently close to allow a single bonding clamp to engage both shields to establish electrical continuity across a splice location.

10. The cable of claim 1, wherein said layer of waterblocking material comprises two longitudinally extending tapes having a water swellable powder disposed therebetween.

11. The cable of claim 1, wherein said outer shield is formed about said inner shield such that longitudinal edge portions thereof cooperate to provide a longitudinally extending seam.

12. The cable of claim 1, wherein a layer of waterblocking material comprises a longitudinally extending water blocking tape comprising a substrate tape which is wrapped about said core between said core and said jacket, said tape being impregnated with a waterblocking material which is swellable upon contact with moisture to block entry of moisture into said core and movement longitudinally along the cable, and having a thickness that is controlled to optimize the tensile strength of the tape and its porosity which prior to its being impregnated is relatively high.

13. The cable of claim 12, wherein said tape comprises a non-woven material and wherein said substrate tape has a relatively small thickness and is a spunbonded polyester material which comprises continuous filament polyester fibers that are randomly arranged, highly dispersed and bonded at filament junctions.

14. The cable of claim 13, wherein said tape has been impregnated with a mixture which comprises water and a superabsorbent material in which the mixture comprises about 4 to 7% by weight of solids.

15. The cable of claim 12 wherein said waterblocking material is selected from the group consisting of: (a) polyacrylic acid, (b) polyacrylamide; (c) blends of (a) and (b); (d) salts of (a) and (b); and (e) copolymers of (a) and (b).

16. The cable of claim 1, wherein a seam of said outer shield is formed so that an outer longitudinal edge portion thereof is directed inwardly toward said core.

17. The cable of claim 1, wherein said web has a height which extends in a direction between centerline longitudinal axes of said core and said support strand and a width which extends normal to said direction and wherein said web has a width of about 0.3 cm.

18. The cable of claim 17, wherein said web has a height in the range of about 0.3 to 0.46 cm.

19. A cable which is suitable for aerial use, said cable comprising:
a core comprising at least one longitudinally extending transmission medium;
a relatively supple system having a portion which encloses said core and a portion which includes a waterblocking constituent which is effective to inhibit the longitudinal flow of water;
a metallic shielding system which encloses said portion of said supple system which encloses said core, said shielding system being such as to provide a substantially high conductivity and a relatively high tensile strength; and
a jacket which is made of a plastic material and which encloses and which is bonded to at least that portion of said shielding system which has a relatively high tensile strength, wherein said relatively supple system includes a laminate having an inwardly facing layer which comprises a plastic dielectric material and an outwardly facing layer which comprises a waterblocking material.

20. The cable of claim 19, wherein said shielding system includes a metallic alloy material having suitable conductivity and suitable tensile strength.

21. A cable, which comprises:
a core comprising at least one longitudinally extending transmission medium;
a relatively supple system having a core wrap portion which encloses said core and a portion which includes an elongated waterblocking member which is disposed about said core wrap portion and which is effective to inhibit the longitudinal flow of water;
a metallic shielding system which encloses said portion of said supple system which encloses said core, said shielding system being such as to provide a substantially high conductivity and a relatively high tensile strength; and
a jacket which is made of a plastic material and which encloses and which is bonded to at least that portion of said shielding system which has a relatively high tensile strength.

22. The cable of claim 21, wherein said shielding system includes a metallic alloy material having suitable conductivity and suitable tensile strength.

* * * * *